United States Patent
Gaspard

(10) Patent No.: US 7,263,553 B2
(45) Date of Patent: Aug. 28, 2007

(54) NETWORK MANAGER SNMP TRAP SUPPRESSION

(75) Inventor: Moise Gaspard, Nepean (CA)

(73) Assignee: Alcatel, Paris (FR)

( * ) Notice: Subject to any disclaimer, the term of this patent is extended or adjusted under 35 U.S.C. 154(b) by 921 days.

(21) Appl. No.: 10/411,263

(22) Filed: Apr. 11, 2003

(65) Prior Publication Data

US 2004/0205186 A1 Oct. 14, 2004

(51) Int. Cl.
*G06F 11/00* (2006.01)

(52) U.S. Cl. .......... 709/224; 726/22; 709/223

(58) Field of Classification Search ........ 709/223, 709/224; 726/3, 22, 23
See application file for complete search history.

(56) References Cited

U.S. PATENT DOCUMENTS

| | | | |
|---|---|---|---|
| 6,321,338 B1* | 11/2001 | Porras et al. | 726/25 |
| 2003/0061514 A1* | 3/2003 | Bardsley et al. | 726/4 |
| 2003/0110396 A1* | 6/2003 | Lewis et al. | 726/4 |
| 2005/0210533 A1* | 9/2005 | Copeland et al. | 726/23 |

OTHER PUBLICATIONS

Guofei Jiang et al.; Multiple Vulnerabilities in SNMP; Computer; vol. 35, Issue 4; pp. 2-4; Apr. 2002.*
Nortel-Networks Portfolio Summary in response to CERT SNMP Vulnerabilities (Advisory CA-2002-03); Version 1.0; Feb. 18, 2002.*
Alex Woodie; Help/Systems Releases SNMP Trapper for OS/400; IT Jungle Newsletter; vol. 2, No. 9; Mar. 5, 2002.*

\* cited by examiner

*Primary Examiner*—Kenneth R. Coulter
(74) *Attorney, Agent, or Firm*—Jim Zegeer

(57) ABSTRACT

Methods and apparatus for controllably suppressing, at a network management system, SNMP event trap messages received from network nodes in a communications network are presented. The rate at which the traps are received from the network nodes is monitored and if the rate exceeds a threshold all subsequent traps received over a set time interval are not processed. The rate is calculated by counting received event traps over a time interval which is either preset or programmed. After the set time interval has passed all newly received traps are monitored. Information regarding traps received during the set time interval may be logged. Additionally, nodes from which excessive traps are received and indicating an event such as a Denial of Service (DoS) attack, are identified so that remedial action can be taken.

16 Claims, 3 Drawing Sheets

NETWORK MANAGER SNMP TRAP SUPPRESSION

FIELD OF THE INVENTION

The invention relates to network management in communication systems and more particularly to systems and methods of protecting network management systems from being overloaded by SNMP event traps received from network nodes.

BACKGROUND OF THE INVENTION

The simple network management protocol (SNMP) is based on a manager/agent model in which the agent requires minimal software. The SNMP, developed in 1988 has become the de facto standard for internetwork management. Because it represents a simple solution which requires little code to implement numerous vendors have been able to build SNMP agents to their products. Generally, SNMP is extensible thereby allowing vendors to easily add network management functions to their existing products. SNMP also separates the management function from the architecture of the hardware devices which broadens the base of multi vendor support.

Most of the processing power and data storage involved in the SNMP protocol resides on the management system while a complementary subset of those functions reside in the managed system. To achieve its goal of being simple SNMP includes a limited set of manual commands and responses. The management system issues get, get next and set messages to retrieve single or multiple object variables or to establish the value of a single variable. The managed agent sends a response message to complete the get, get next or set message. The managed element sends an event notification called a trap to the management system to identify the occurrence of conditions such as thresholds that exceed a predetermined value. In short there are five primitive operations namely get, get next, get response, set and trap.

Traps are asynchronous messages that notify SNMP managers of significant events that have occurred at the agent or node. Traps are sent unsolicitedly to the SNMP managers that are configured to receive them.

It will be apparent to one skilled in the art that event traps can identify potential problems with network nodes particularly if the management system receives a large number of traps from a particular node. It will also be apparent to one skilled in the art that such traps can be used by a malicious attacker to interrupt services provided by the network management system.

The CERT® Coordination Center has issued warning on potential flaws in the SNMP protocol, among others, that can be exploited for malicious attacks. A solution proposed by CERT to defend against such attacks involves identifying the offending node (i.e. the generator of the excessive SNMP event traps) and disabling SNMP on that node, if possible. Unfortunately, this is not an option for an NMS because it would no longer be able to manage that node, and this would be unacceptable to the network provider.

Another significant industry source of SNMP services addresses this problem by correlating certain types of traps so that the dissemination of duplicate traps of these types can be prevented. This technique is applied to certain standard types of traps, e.g. link up/down traps, etc. Unfortunately, this approach is limited because it doesn't address non-standard traps, e.g. unknown event traps, which cause an NMS to exhaust significant resources to analyze them.

Therefore, an improved technique for an NMS to respond to excessive SNMP event traps would be desirable. The problems with prior art solutions are, as discussed above, the CERT solution disables SNMP on the offending node which is not acceptable for a NMS while the second solution is limited to certain standard types of traps, and does not address non-standard traps such as unknown event traps, which can be particularly processing intensive to analyze.

There therefore is a need to solve the above mentioned issues.

SUMMARY OF THE INVENTION

The present invention relates to the problem of protecting a Network Management System (NMS) from being overloaded by excessive SNMP event traps from a network node. The cause of the excessive traps could be a Denial-of-Service (DoS) attack on the network node, or possibly a failure in the node causing excessive SNMP event messaging.

The invention protects the NM from a flood of SNMP messages of any type, not just standard messages as in the prior art.

The invention effectively protects the NM from malicious attacks on network nodes, such as DoS attacks, and alerts an operator of the situation so that corrective actions can be taken. Likewise, the invention protects the NM from faulty nodes generating an excessive amount of SNMP event traps. The invention will also moderate the SNMP loading on the NM when nodes restart. This loading could otherwise be quite large if several nodes restart simultaneously.

In accordance with an aspect of the present invention there is provided a method of suppressing, at a network management system, SNMP event trap messages from network nodes in a communication network, the method comprising the steps of: counting, at the network management system, event trap messages received from each network node during a time interval; and responsive to the count exceeding a threshold, ignoring all further event trap messages sent by that network node to the network management system until a predetermined suppression period has expired.

In accordance with a second aspect of the present invention there is provided a system for suppressing, at a network management system, SNMP event trap messages received from network nodes in a communication network, the system comprising: a counter, at the network management system, for counting event trap messages received from each network node during a time interval; and means, responsive to the count exceeding a threshold, for ignoring all further event trap messages sent by that network node to the network management system until a predetermined suppression period has expired.

BRIEF DESCRIPTION OF THE DRAWINGS

The features and advantages of the invention will become more apparent from the following detailed description of the preferred embodiment(s) with reference to the attached diagrams wherein.

DETAILED DESCRIPTION OF THE INVENTION

Figure 1:
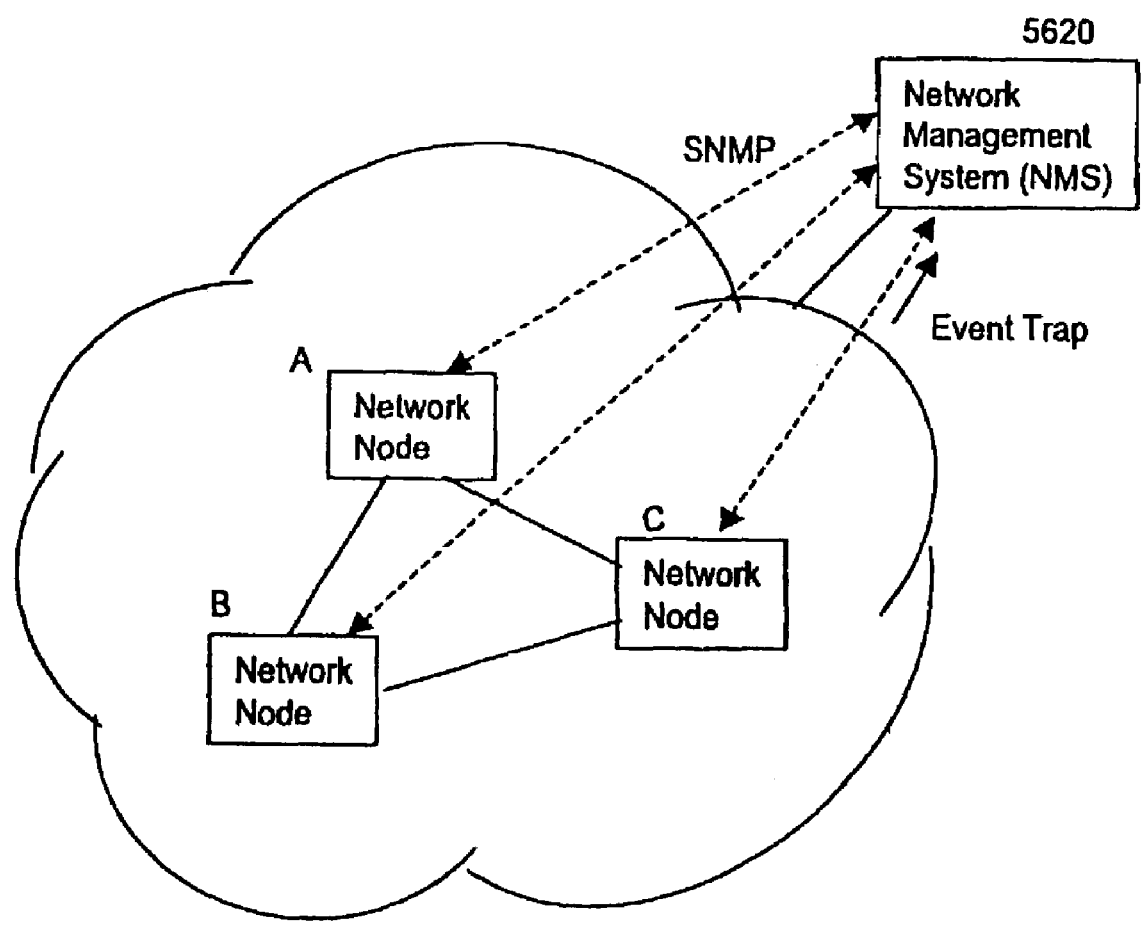
FIG. 1 is a high level network diagram showing elements of the invention.

FIG. 1 depicts a simplified network comprising three network nodes (A, B, and C) interconnected to form a communications network with links to an NMS for network and services management. Each of the nodes communicates the occurrence of events to the NMS using SNMP event trap messages, e.g. link up/down. The NMS can also request information from the nodes, using SNMP "get" messages, or configure resources on the nodes, using SNMP "set" messages, among other functions. When an event trap is of unknown type (a.k.a. an unknown event trap), additional processing is required by the NMS to analyze the trap over standard, known event traps. Therefore, DoS attacks that are particularly effective for their illicit purpose are those that cause excessive numbers of unknown event traps to be generated by a node. The receipt of hundreds of thousands of unknown event traps per second could completely "busy-out" a NMS.

According to the invention an NMS is provided with the capability to block SNMP event traps from other processing on the NMS when the arrival rate of the traps from a particular node exceeds a predetermined threshold. This capability is referred to as the trap suppression feature.

A file on the NMS defines certain parameters needed for trap suppression. The first parameter enables, or disables, the trap suppression feature. The default value is enabled. The next parameter is the maximum trap arrival rate per node for all types of traps. The default value of this parameter is 100 traps/second. The preferred embodiment uses the same arrival rate value for all nodes and trap types. However, it would be possible to specify separates arrivals rates per trap type and per node type in other embodiments. The next parameter is the trap suppression latency, which specifies the amount of time that traps will be blocked from an offending node after that node has exceeded the maximum trap arrival rate. The default value for this parameter is 100 seconds. A final parameter is the aging time, which specifies the amount of time that records of a node will be kept by the feature. For each node, this time is measured from the time of the last trap from that node. The default aging time value is 100 minutes.

In normal operation, the traps received from any particular node should not exceed the maximum trap arrival rate. For each node, while the actual trap arrival rate is less than the maximum trap arrival rate, the traps from that node are forwarded to higher level processes in the NMS that have registered to receive traps. Examples of these processes are the Auto-discovery process and the Alarm Surveillance (GGP) process. The number of traps received from each node are counted during a predefined interval (e.g. 10 seconds) by a counter to determine the trap arrival rate for each node. The duration of the interval could also be defined by a parameter in the parameters file, and could thereby be programmable.

When a node exceeds the maximum trap arrival rate all further traps from that node are dropped (i.e. not forwarded) for a duration specified by the trap suppression latency parameter (e.g. 100 seconds). This occurrence is logged and may optionally be notified to processes such as the alarm surveillance process (GGP), so that a network operator can take appropriate remedial action (e.g. set up a firewall, run diagnostics on the offending node, etc.). After the duration of blocking traps has passed, the NMS starts forwarding traps received from the node as long as it does not exceed the maximum trap arrival rate, otherwise traps are blocked as before and the procedure is repeated.

Figure 2:
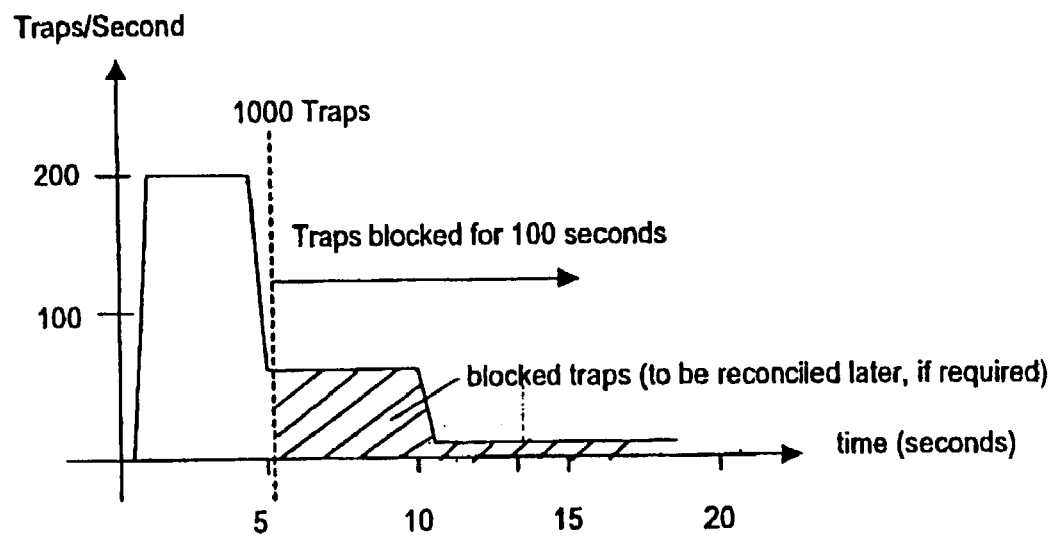
FIG. 2 is an example graph of event traps received at a node.
Figure 3:
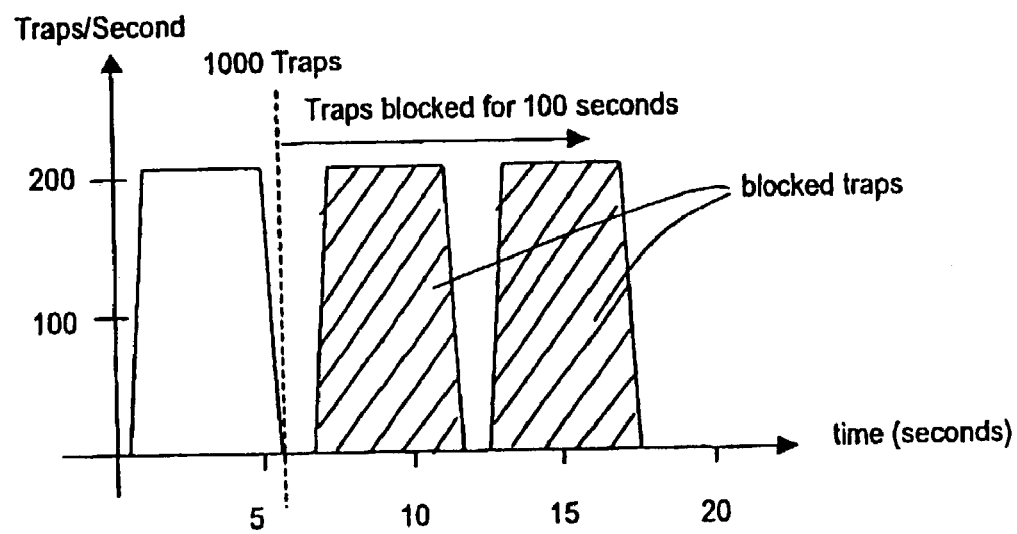
FIG. 3 is a second example graph.

FIGS. 2 and 3 show example graphs of received event traps from a node. In FIG. 2 at time zero seconds the event traps received from the node start to increase dramatically, which could be the result of a restart of the node. The traps per second quickly increases to 200 traps/second before leveling off, and remain at that rate for five seconds. Therefore, after about five seconds the total number of traps received is 1,000 traps. Assuming a duration for the trap suppression feature of 5 seconds means that the calculated trap arrival rate is 200 traps/second. Therefore, the NMS will block all further event traps from this node for the duration specified by the trap suppression latency parameter, e.g. 100 seconds. Hashing under the curve in FIG. 2 indicates the blocked traps. These event traps can be reconciled (retrieved from the node) by the NMS at a later time.

FIG. 3 shows another example of traps arrivals at the NMS. In this case the node sending the traps sends a very large number of traps at repeated intervals. This could be due to some failure that causes continual restarts or from a DoS attack. The NMS blocks all event traps received from the node after the trap arrival rate is exceeded, and for the duration of specified by the suppression latency parameter. The trap suppression feature alerts an operator of this condition so that appropriate actions can be taken.

The following sets out the process steps involved in implementing the algorithm according to the invention.

1) The Network Management System (NMS) starts up and reads the Trap Suppression Configuration Status.
2) The NMS enable the Trap suppression Algorithm (Based on the Trap Suppression Configuration status). If the Trap Suppression status is Disabled, no trap suppression is done and then all Traps will go through.
3) The Trap Suppression Algorithm Reads its configuration and updates all required parameters: Trap Suppression Latency (in sec.), Trap Suppression Aging Time(in Sec.), Trap Suppression Counter, and Trap Suppression Arrival Rate.
4) The Suppression Algorithm fully Configured and ready to process Traps.
5) First Trap received from a node; the Trap Suppression algorithm Notifies the Administrator and Gives Description a short description about the Sender (the sending node): IP Address of the Node and the Time the Traps was sent.
6) The NSM Keeps records of the node sending Traps: the number of Trap sent so far, the First Time and the Last time Trap was sent.
7) The Trap suppression Algorithm Evaluates (Computes) the Trap sending Rate
8) Stop Processing Trap from that Node when Trap Sending Rate is Higher than expected (based on a Threshold: the Trap Suppression Arrival Rate).
9) Notifies the Administrator so that further action can be taken.
10) The Trap Suppression Algorithm Starts the Trap Latency Timer for that Node.
11) Resume Trap Processing for that node when the Trap Latency Time expires (The Current trap Latency for the node is compared against the configured Trap Latency)
12) The Network Administrator receives notification of that.

13) If that same node stop sending Traps for a period of time greater of equal to the Node aging time, then the algorithm ages the node. The record in step 7 for that node is deleted.

Figure 4:
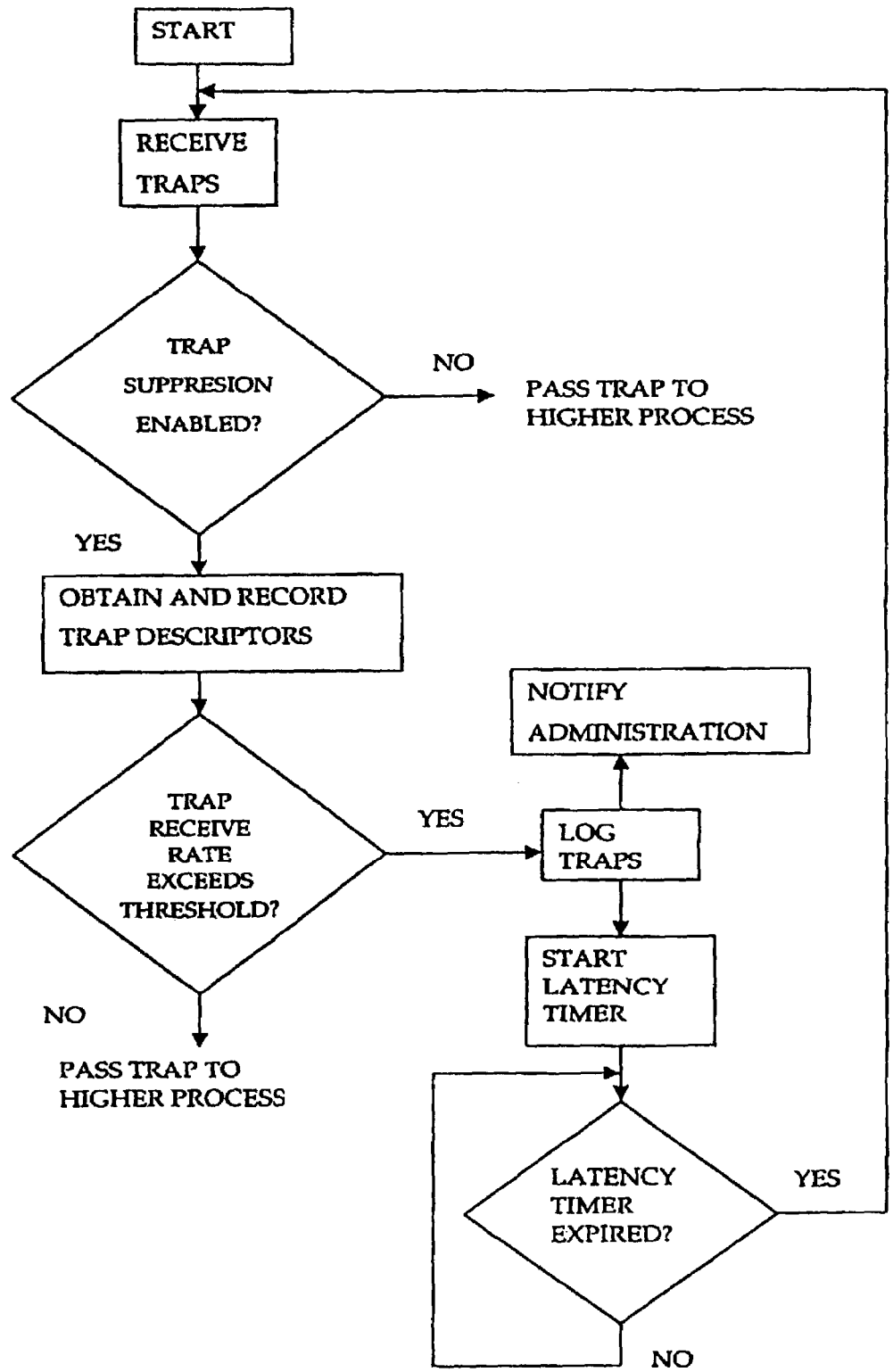
FIG. 4 is a flow diagram showing process steps implementing the invention.

FIG. 4 is a simplified flow diagram depicting the process steps of the algorithm.

The algorithm when implemented according to the invention effectively blocks a malicious node from sending unwanted Traffic to the NSM. It also allows the NMS administrator to detect which node is sending trap events to the NSM. The first time a node is sending a trap to the NSM, the algorithm, notifies the NMS Administrator regardless of the Trap Rate. The NSM Administrator can also double-check the nodes that are sending traps. When the NSM no longer manages the node it is removed from the records. The algorithm allows for the configuring of all required parameters for Trap suppression and increases the efficiency of the NMS.

It is anticipated that the algorithm will facilitate the use of a Generic alarm such as X.733 the de-facto Standard Alarm Format in the Industry.

The algorithm of the invention leads to greater system efficiency in that only a record of Predefined parameters for each managed node is kept for Trap suppression purposes. These parameters are: Trap Arrival Rate Computation, Trap suppress Latency computation and Node Aging Time Computation.

According to the invention the algorithm, serves to notify the NMS Administration in the following circumstances:
When a node sends a Trap the First Time,
When Trap reception is blocked
When trap Reception is resumed
When a node is aged The result is that attacks such as DoS and network disruption are to be detected and steps taken to overcome problems flowing therefrom.

The embodiments presented are exemplary only and persons skilled in the art would appreciate that variations to the above described embodiments may be made without departing from the spirit of the invention. The scope of the invention is solely defined by the appended claims.

I claim:

1. A method of suppressing, at a network management system (NMS), SNMP event trap messages from network nodes in a communication network, the method comprising the steps of:
providing said NMS with a trap suppression function with a configurable set of parameters, said set of parameters including a maximum trap arrival rate per node and a trap suppression latency time;
counting, at the network management system, event trap messages received from each network node during a time interval; and
responsive to the count for a certain network node exceeding said maximum trap arrival rate, enabling said trap suppression function for droping all further event trap messages sent by that network node to the network management system until said trap suppression latency time has expired.

2. The method as defined in claim 1 wherein said trap suppression latency time starts from a time at which the maximum trap arrival rate is exceeded, after which expiration the network management system resumes processing event trap messages sent by that network node.

3. The method as defined in claim 1 wherein said trap suppression latency time is programmable.

4. The method as defined in claim 1 wherein the maximum trap arrival rate is specified based on the type of node from which the event trap message are received.

5. The method as defined in claim 1 wherein the maximum trap arrival rate is specified in accordance with type of trap message received from the network node.

6. The method as defined in claim 1 wherein said set of parameters further comprises an aging time for enabling back said trap suppression function after a predetermined time interval.

7. The method as defined in claim 1 wherein said trap suppression function keeps a record of all periods when said trap suppression function has been enabled for each node that is sending traps.

8. The method as defined in claim 7 wherein all records pertaining to any given node are deleted after a time measured from the last trap received from that node.

9. The method as defined in claim 1 wherein the network management system selectively logs all nodes that have exceeded the respective maximum trap arrival rate.

10. The method as defined in claim 1 wherein the network management system selectively provides a notification with respect to nodes that have exceeded their maximum trap arrival rate.

11. The method as defined in claim 10 wherein the notification is an alarm.

12. The method as defined in claim 10 wherein the notification alerts an operator that a node has exceeded the maximum trap arrival rate so that remedial action can be taken.

13. A trap suppression system for suppressing, at a network management system (NMS), SNMP event trap messages received from network nodes in a communication network, the system comprising:
a trap suspension function for enabling or disabling processing of SNMP event trap messages received at said NMS from the nodes of said network;
for each network node, a first counter measuring a trap suppression latency time specifying the amount of time during which said event trap messages should be blocked;
a second counter, for counting event trap messages received from each network node during said respective trap suppression latency time interval; and
means, responsive to the second count exceeding a maximum trap arrival rate, for identifying an offending node that sends an excessive number of event trap messages and enabling said trap suspension function to drop all further event trap messages sent by that of offending network node to the network management system until said trap suppression time has expired.

14. The system as defined in claim 13 wherein the trap suppression latency time is programmable.

15. The system as defined in claim 13 further including means to log all periods when the maximum trap arrival rate has been exceeded resulting in said trap suppression function being enabled.

16. The system as defined in claim 15 having aging means to set parameters as to how long logging information is retained.

* * * * *